(12) United States Patent
Stout et al.

(10) Patent No.: US 9,098,754 B1
(45) Date of Patent: Aug. 4, 2015

(54) METHODS AND SYSTEMS FOR OBJECT DETECTION USING LASER POINT CLOUDS

(71) Applicant: Google Inc., Mountain View, CA (US)

(72) Inventors: James Stout, Mountain View, CA (US); Jiajun Zhu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/262,651

(22) Filed: Apr. 25, 2014

(51) Int. Cl.
*G06K 9/00* (2006.01)
*G06K 9/46* (2006.01)

(52) U.S. Cl.
CPC .......... *G06K 9/00805* (2013.01); *G06K 9/4609* (2013.01)

(58) Field of Classification Search
CPC .... G06K 9/00214; G06T 17/20; G06T 17/00; G01B 11/002; G01B 11/24; G01C 11/00; G01C 15/002; G01S 17/89; G01S 7/4817; G01S 7/4818; G01S 7/4811; G01S 7/484
USPC .......................................... 382/103, 104, 107
See application file for complete search history.

(56) References Cited

U.S. PATENT DOCUMENTS

| | | | | |
|---|---|---|---|---|
| 5,504,847 | A * | 4/1996 | Kimura et al. | 345/420 |
| 5,936,628 | A * | 8/1999 | Kitamura et al. | 345/420 |
| 7,215,430 | B2 | 5/2007 | Kacyra et al. | |
| 8,401,242 | B2 * | 3/2013 | Newcombe et al. | 382/107 |
| 8,792,726 | B2 * | 7/2014 | Watanabe et al. | 382/195 |
| 2012/0013713 | A1 * | 1/2012 | Sumitomo | 348/46 |
| 2013/0141546 | A1 * | 6/2013 | Asatani et al. | 348/48 |

OTHER PUBLICATIONS

Reza, A Relational Approach to Plane-based Object Categorization, The University of New South Wales, 2012, Sydney, Australia.
Holz, Fast Range Image Segmentation and Smoothing using Approximate Surface Reconstruction and Region Growing, University of Bonn, 2012, Germany.
Einramhof, Fast Range Image Segmentation for a Domestic Service Robot, Vienna University of Technology, 2011, Wien, Austria.

* cited by examiner

*Primary Examiner* — Tom Y Lu
(74) *Attorney, Agent, or Firm* — McDonnell Boehnen Hulbert & Berghoff LLP

(57) ABSTRACT

Methods and systems for object detection using laser point clouds are described herein. In an example implementation, a computing device may receive laser data indicative of a vehicle's environment from a sensor and generate a two dimensional (2D) range image that includes pixels indicative of respective positions of objects in the environment based on the laser data. The computing device may modify the 2D range image to provide values to given pixels that map to portions of objects in the environment lacking laser data, which may involve providing values to the given pixels based on the average value of neighboring pixels positioned by the given pixels. Additionally, the computing device may determine normal vectors of sets of pixels that correspond to surfaces of objects in the environment based on the modified 2D range image and may use the normal vectors to provide object recognition information to systems of the vehicle.

20 Claims, 10 Drawing Sheets

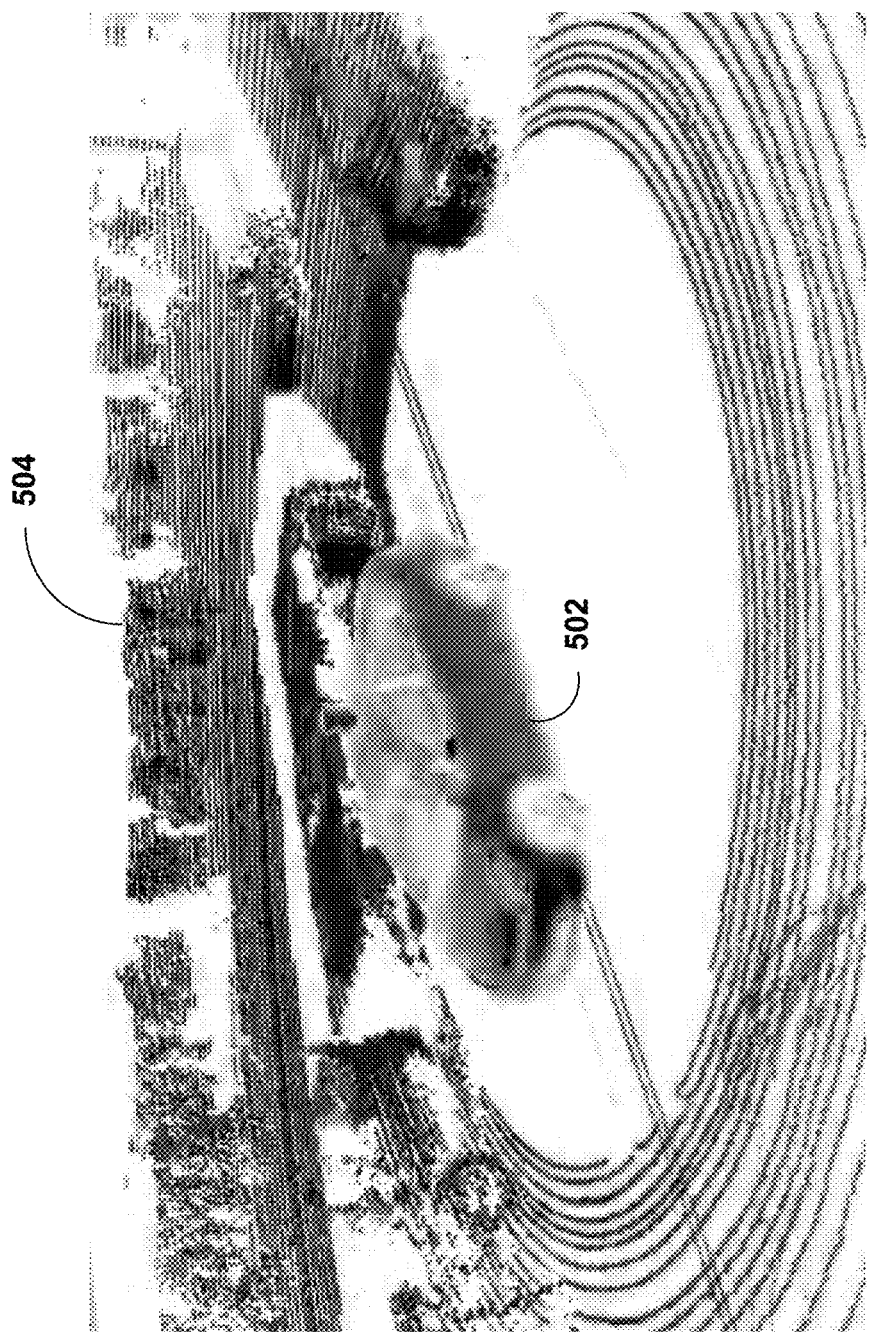

METHODS AND SYSTEMS FOR OBJECT DETECTION USING LASER POINT CLOUDS

BACKGROUND

Unless otherwise indicated herein, the materials described in this section are not prior art to the claims in this application and are not admitted to be prior art by inclusion in this section.

A vehicle may navigate a path of travel using information provided by sensors. A computing device of the vehicle may process information received from vehicle sensors to avoid collisions with obstacles and ensure proper navigation. Such vehicles are typically equipped with various types of sensors in order to detect objects in the surroundings. For example, an autonomous vehicle may include lasers, sonar, RADAR, cameras, and other devices which scan and record data from surroundings of the vehicle. Sensor data from one or more of these devices may be used to detect objects and their respective characteristics (position, shape, heading, speed, etc.). This detection and identification is useful for the safe operation of autonomous vehicle.

SUMMARY

The present application discloses embodiments that relate to methods and systems for object detection using laser point clouds.

In one example, the present application describes a method. The method may comprise receiving, at a computing device, laser data indicative of an environment of a vehicle, and the laser data includes a plurality of data points associated with one or more objects in the environment. The method may also include, based on the plurality of sensor data points, generating a two dimensional range image that includes a plurality of pixels indicative of respective positions of the one or more objects in the environment relative to the vehicle. Additionally, the method may include modifying the generated two dimensional range image to provide respective values to one or more given pixels of the plurality of pixels that map to one or more portions of the one or more objects in the environment lacking laser data. In some instances, modifying the generated two dimensional range image to provide respective values to the one or more given pixels is based on respective neighboring pixels of the plurality of pixels positioned proximal to the one or more given pixels of the plurality of pixels in the two dimensional range image. The method may include determining a plurality of normal vectors of one or more sets of pixels in the plurality of pixels that correspond to respective surfaces of the one or more objects in the environment of the vehicle based on the modified two dimensional range image and providing object recognition information indicative of the one or more objects in the environment of the vehicle to one or more systems of the vehicle based on the plurality of normal vectors of the one or more sets of pixels.

In another example, the present application describes a non-transitory computer readable medium having stored thereon executable instructions that, upon execution by a computing device, cause the computing device to perform functions. The functions may comprise receiving laser data indicative of an environment of a vehicle, and the laser data includes a plurality of data points associated with one or more objects in the environment. The functions may also include, based on the plurality of sensor data points, generating a two dimensional range image that includes a plurality of pixels indicative of respective positions of the one or more objects in the environment relative to the vehicle. Additionally, the functions may include modifying the generated two dimensional range image to provide respective values to one or more given pixels of the plurality of pixels that map to one or more portions of the one or more objects in the environment lacking laser data. In some instances, modifying the generated two dimensional range image to provide respective values to the one or more given pixels is based on respective neighboring pixels of the plurality of pixels positioned proximal to the one or more given pixels of the plurality of pixels in the two dimensional range image. The functions may include determining a plurality of normal vectors of one or more sets of pixels in the plurality of pixels that correspond to respective surfaces of the one or more objects in the environment of the vehicle based on the modified two dimensional range image and providing object recognition information indicative of the one or more objects in the environment of the vehicle to one or more systems of the vehicle based on the plurality of normal vectors of the one or more sets of pixels.

In still another example, the present application describes a system. The system may comprise at least one processor. The system may also comprise a memory having stored thereon executable instructions that, upon execution by the at least one processor, cause the system to perform functions comprising receiving laser data indicative of an environment of a vehicle, and the laser data includes a plurality of data points associated with one or more objects in the environment. The functions may also include, based on the plurality of sensor data points, generating a two dimensional range image that includes a plurality of pixels indicative of respective positions of the one or more objects in the environment relative to the vehicle. Additionally, the functions may include modifying the generated two dimensional range image to provide respective values to one or more given pixels of the plurality of pixels that map to one or more portions of the one or more objects in the environment lacking laser data. In some instances, modifying the generated two dimensional range image to provide respective values to the one or more given pixels is based on respective neighboring pixels of the plurality of pixels positioned proximal to the one or more given pixels of the plurality of pixels in the two dimensional range image. The functions may include determining a plurality of normal vectors of one or more sets of pixels in the plurality of pixels that correspond to respective surfaces of the one or more objects in the environment of the vehicle based on the modified two dimensional range image and providing object recognition information indicative of the one or more objects in the environment of the vehicle to one or more systems of the vehicle based on the plurality of normal vectors of the one or more sets of pixels.

In another example, a system is provided that comprises a means for real-time generation for unstructured and structured laser point clouds. The system may also comprise a means for receiving laser data indicative of an environment of a vehicle, and the laser data includes a plurality of data points associated with one or more objects in the environment. The system may also include means for generating a two dimensional image that includes a plurality of pixels indicative of respective positions of the one or more objects in the environment relative to the vehicle based on the plurality of sensor data points. Additionally, the system may include means for modifying the generated two dimensional range to provide respective values to one or more given pixels of the plurality of pixels that map to one or more portions of the one or more objects in the environment lacking laser data. In some instances, the system may comprise means for modifying the generated two dimensional range image to provide respective values to the one or more given pixels is based on respective neighboring pixels of the plurality of pixels positioned proximal to the one or more given pixels of the plurality of pixels in the two dimensional range image. The system may include means for determining a plurality of normal vectors of one or more sets of pixels in the plurality of pixels that correspond to respective surfaces of the one or more objects in the environment of the vehicle based on the modified two dimensional range image and means for providing object recognition information indicative of the one or more objects in the environment of the vehicle to one or more systems of the vehicle based on the plurality of normal vectors of the one or more sets of pixels.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5A shows the example vehicle from a front-side view and illustrates portions of a virtual two dimensional range image generated by a computing device of the example vehicle using sensor data.

DETAILED DESCRIPTION

Figure 1:
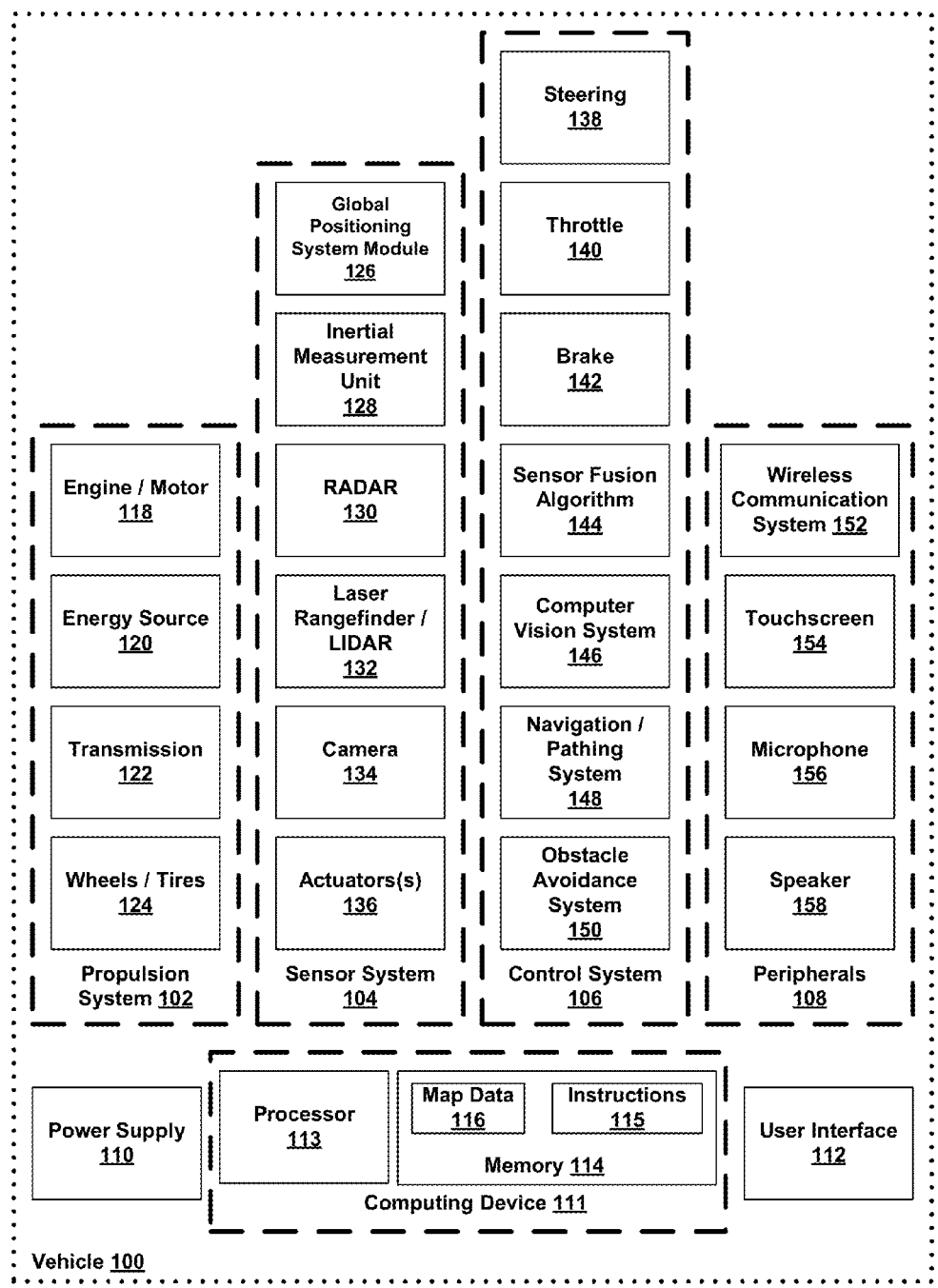
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A vehicle, such as an autonomous or driverless vehicle, may navigate a path of travel without requiring a driver to provide guidance and control. To enable safe, autonomous navigation, a vehicle may utilize data about the local environment surrounding the vehicle acquired from sensors associated with the vehicle. An autonomous vehicle may include one or multiple computing devices configured to receive and process information about the nearby environment received from sensors as the vehicle operates. Processing the information may enable the computing device to provide information and/or instructions to the systems of the vehicle to perform a safe navigation strategy as the vehicle travels through changing environments.

In one example embodiment, a vehicle may navigate while receiving laser data indicative of the environment at one or multiple computing devices of the vehicle. For example, the vehicle may include a LIDAR module configured to capture sensor data, such as laser data made up of data points associated with one or more objects in the environment. Similarly, the vehicle may also include other types of sensors configured to provide sensor data that may be used for object detection, such as depth cameras. The computing device may receive the data points indicative of the environment in a structured three dimensional (3D) point cloud and/or unstructured 3D point cloud, for example. In some instances, the computing device may receive data points within a grid-like point cloud. The laser data may include data points containing information indicative of the positions of objects in the environment relative to the vehicle. In other examples, the laser data may include other information about the vehicle's environment.

During operation, the computing device may use the laser data points to generate a two dimensional (2D) range image that includes pixels indicative of positions of objects in the environment. As an example, the computing device may project the laser data points onto a conceptual 2D cylindrical surface positioned around the vehicle or virtually positioned around the vehicle in a virtual rendering so that the pixels correspond to data within the laser data points. The resulting generated 2D range image may include pixels that have values indicative of information in the environment and may also include some pixels that may not have a value from laser data points. The pixels missing values may correspond to portions of objects that the computing device did not receive laser data indicative of. In some example embodiments, the computing device may start generating portions of a 2D range image prior to completing the reception of an entire point cloud. For example, the computing device may develop portions of the 2D range image as the points are received from the LIDAR module.

Furthermore, the vehicle's computing device may modify the 2D range image to fill in gaps that result from pixels without values. For example, the computing device may use respective neighboring pixels positioned proximal to the one or more gaps in the 2D range image to determine an average value to assign to pixels in the gap that may originally not have a value. The computing device may use the modified 2D range image to determine one or multiple normal vectors of sets of pixels that may correspond to respective surfaces of the one or more objects in the environment of the vehicle.

In some examples, the computing device may use the surface normals and plane segmentation processes to classify planes in the acquired sensor data (e.g., associate sets of pixels with surfaces in the environment), which may assist the vehicle in object recognition and obstacle avoidance. The computing device may develop a virtual mapping of objects within the environment as the vehicle navigates. Additionally, the computing device may use the normal vectors of sets of pixels as well as plane segmentation to provide object recognition information about the environment to systems of the vehicle, which the vehicle systems may use during operation to determine appropriate navigation strategies.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be travelling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two dimensional range image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
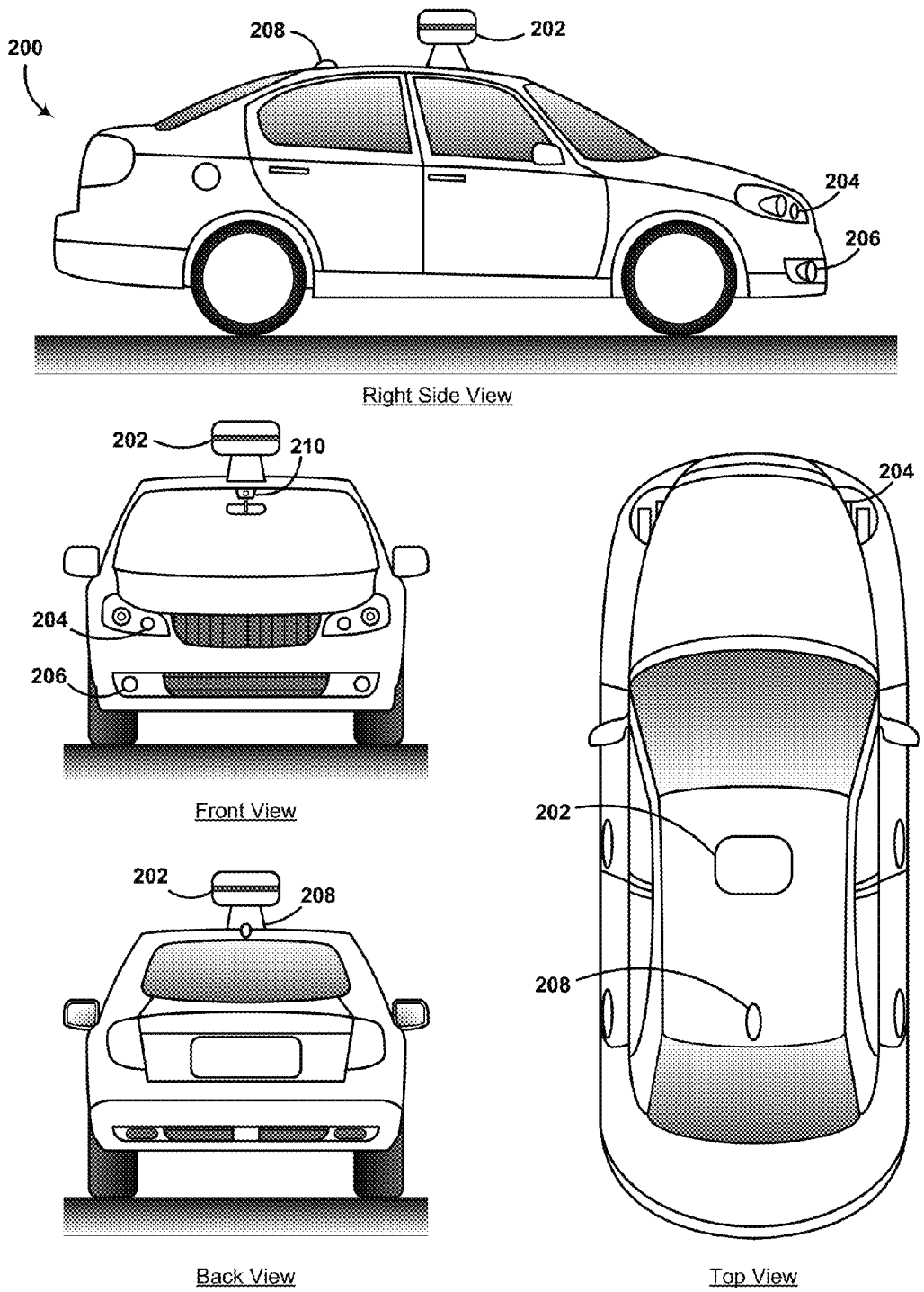
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
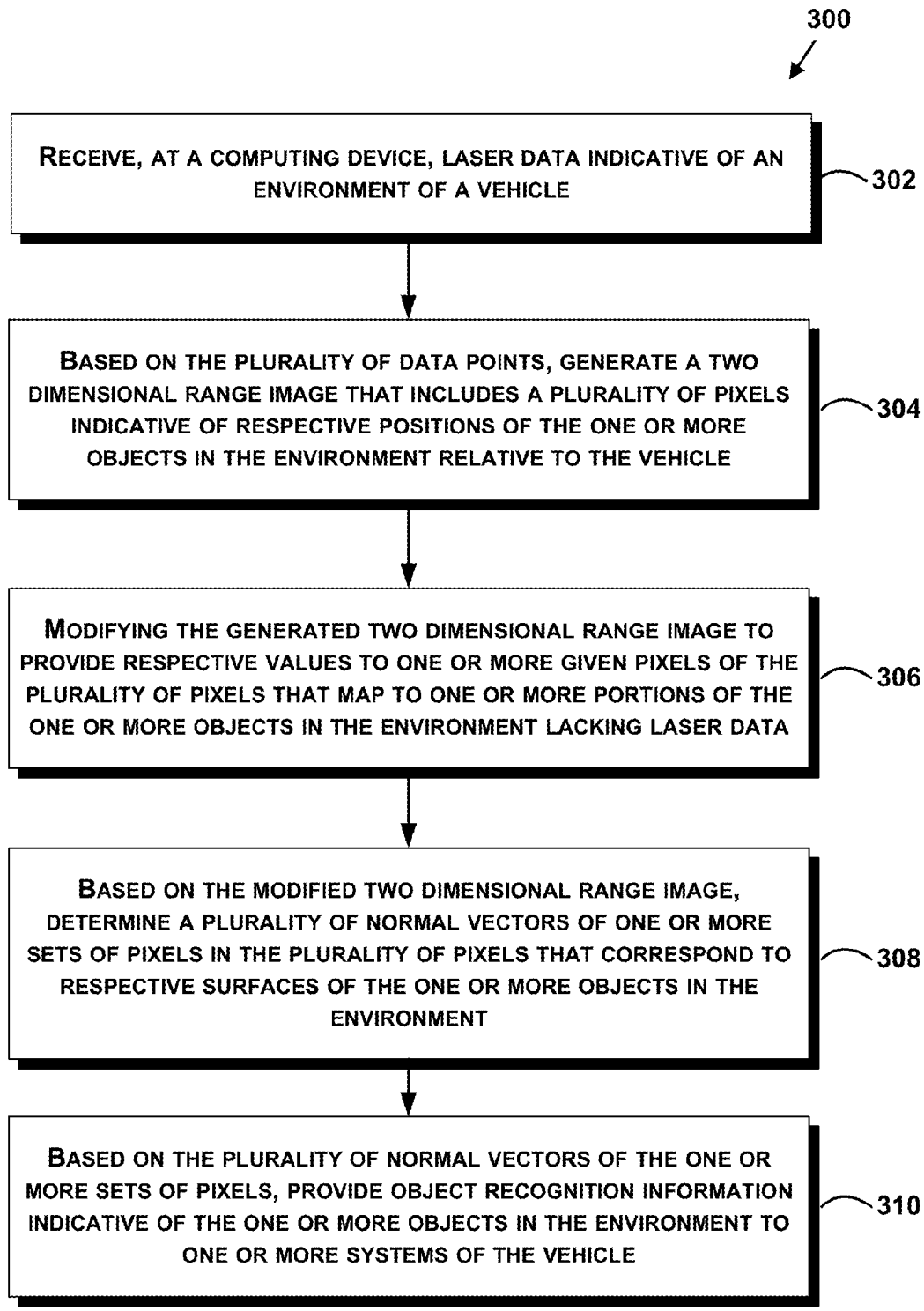
FIG. 3 is a flow chart of an example method for object detection using laser point clouds.

FIG. 3 is a flow chart of an example method 300 for object detection using laser points clouds. The method 300 may include one or more operations, functions, or actions as illustrated by one or more blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be a vehicle, such as the example vehicle 200 illustrated in FIG. 2. Alternatively, the computing device or system that executes some or all of the stored instructions could be another computing device or system, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. In some example implementations, the method may be executed by a robotic device or other types of computing devices as well. Other examples of computing devices or combinations of computing devices that can implement an example method are possible.

At block 302, the method 300 may include receiving, at a computing device, laser data indicative of an environment of a vehicle. An example vehicle or robotic device may function using information provided by sensor(s) configured to capture measurements about the surrounding environment. In particular, a computing device of the operating vehicle or robotic device may receive sensor data from various sensors and process the data for use during operation, including for the determination and execution of control strategies.

As shown in FIGS. 1-2, an example vehicle may include a variety of sensors, including a LIDAR module configured to perform sweeps of the nearby environment to capture laser data corresponding to objects near the vehicle. The LIDAR module may capture and provide information about the environment to the vehicle's computing device in the form of laser data points, which may arrive at the computing device in the form of a point cloud. Depending on the type of LIDAR module, the computing device may receive any number of laser data points configured in a structured or unstructured point cloud, for example. For example, the computing device may receive laser data in a structure point cloud with each data point or sets of data points arranged based on objects in the local environment. An unstructured point cloud may include data points randomly received without any particular arrangement of the data points.

Furthermore, the laser data points within the point cloud may have a structure that includes a grid-like format or may arrive at the computing device in points clouds that lack the grid-like format.

In other example embodiments, a vehicle's computing device may receive data from other sensors, such as images from RGB-depth cameras. The computing device may receive data from other sensors in addition to data points provided using LIDAR. The computing device may combine information received from multiple sensors, such as LIDAR and cameras.

At block 304, the method 300 may include, based on the plurality of laser data points, generating a two dimensional range image that includes a plurality of pixels indicative of respective positions of the one or more objects in the environment relative to the vehicle. As the vehicle's computing device receives data from LIDAR and/or other sensors, the computing device may generate a 2D range image based on the received data. The computing device may wait to complete receiving an entire 3D point cloud from a sensor prior to developing the 2D range image or may proceed to determine the 2D range image prior to completely receiving the 3D point cloud. For example, the computing device may develop portions of a 2D range image as laser data is received from the sensor. The computing device may generate the two dimensional range image based on incoming laser data, which may indicate distances between objects and the vehicle within the pixels of the range image, for example.

In one example embodiment, the vehicle's computing device may receive laser data form LIDAR in an unstructured 3D point cloud. The computing device may structure the data points by projecting them onto a conceptual cylindrical 2D surface surrounding the vehicle. In particular, the computing device may use the known location of the sensor relative to objects in the environment as well as the 3D laser data points to project the points in a proper order on the conceptual cylindrical 2D surface to reflect the vehicle's environment. As a result, the computing device may develop an image that exists as a 360 degree panorama using the laser data points with the values of each pixel making up the range image reflecting the data within the original 3D laser data point. In some instances, the 2D range image may include one or multiple gaps, which may consist of pixels with no assigned values. Furthermore, the computing device may develop other images using the laser data, such as a 180 degree image or other formats. In an example implementation, the computing device may develop multiple 2D range images or determine a 3D format structure indicative of the data received from sensors.

Configuring the laser data onto the conceptual cylindrical 2D surface may enable the computing device to position the laser data into pixels within the 2D range image that may accurately reflect the vehicle's environment. The different pixels may provide information about the environment, including information about positions of objects relative to the vehicle. The value of each pixel in the panorama may correspond to the original point received in sensor data. Some pixels within the 2D range image may not have a value assigned, which may cause gaps in the 2D range image overall. In other example implementations, the computing device may format sensor data into other configurations for analysis.

In another example, the computing device may receive laser data in a structured format, such as a structured 3D point cloud. The computing device may utilize the laser data to project the data into a 2D conceptual image, which may reflect information contained in the laser data points in a 2D format. For example, the 2D range image may include information indicative of objects' positions in the environment relative to other objects and the vehicle.

In some instances, the computing device may determine a gradient or gradients in the two dimensional image and smooth the gradient(s) of the 2D range image using integral images. For example, the computing device may use a reduction algorithm because of dependence of prior computation. The computing device may quickly and efficiently generate a sum of values in a rectangular subset of a grid, such as a number of pixels within the 2D range image.

The computing device may use sensor data acquired from multiple sensors and/or received in successive scans to generate a 2D range image for analysis. For example, the computing device of a vehicle may receive multiple sets of laser data indicative of the same area in the local environment from a LIDAR unit. The computing device may use the multiple scans and multiple sets of laser data to develop the 2D range image. The multiple sets of laser data may confirm or correct areas that may have been incorrectly received in an initial scan, for example.

At block 306, the method 300 may include modifying the generated two dimensional range image to provide respective values to one or more given pixels of the plurality of pixels that map to one or more portions of the one or more objects in the environment lacking laser data. As previously indicated, the computing device may generate a 2D range image using data points provided by sensor(s). The development of a 2D range image may result in a 2D range image that is made up of pixels with values encompassing the data of data points and some pixels that may not include values (e.g., gaps in the image). For the respective pixels missing a value within the 2D range image, the computing device may approximate their location and/or value using nearby neighboring pixels positioned close or next to the empty pixels in the situations that neighboring pixels are available.

In order to assign values to pixels lacking values within the 2D image, the computing device may perform one or multiple processes. For example, the computing device may modify the 2D range image to fill in gaps based on an average value of respective neighboring pixels positioned proximal to gaps containing empty pixel values in the 2D range image. In some examples, the computing device may use the neighboring pixels in pairs to determine values of a pixel in a gap without a value. For example, the computing device may use the average value of the pixel above and pixel below an empty pixel without a value to determine a value for the empty pixel. Likewise, the computing device may use the pixel to the left and right of an empty pixel in a gap to determine an average value to assign to the empty pixel in the gap. In other examples, the computing device may use additional pixels in other combinations to determine a value for an empty pixel within a gap in the 2D range image.

At block 308, the method 300 may include, based on the modified two dimensional range image, determining a plurality of normal vectors of one or more sets of pixels in the plurality of pixels that correspond to respective surfaces of the one or more objects in the environment. The computing device may calculate the normal vectors of pixels that correspond to the same surface in the environment for object recognition purposes, which may assist the vehicle in autonomous navigation.

In order to improve object recognition and ensure safe navigation, the computing device may determine normal vectors of surfaces as represented in the 2D range image in real time as the 2D range image is developed and processed. As such, the computing device may be configured to determine normal vectors within laser data received in point clouds efficiently with relatively few CPU cycles, and may provide the determined normal with minimal latency to various systems of the vehicle.

In one example embodiment, the computing device may determine vector normal of sets of pixels by computing gradients across and down the image and smoothing the gradients using integral images. As a result, the computing device may compute normalized cross products of the gradients to produce the vector normal of various surfaces as indicated by sets of pixels. For example, the computing device may compute two vectors which are tangential to the local surface at the center of a set of pixels. From the two tangential vectors, the computing device may compute the vector normal using the cross product. For example, the computing device may compute a surface normal between a left and a right neighboring pixel and between an upper and lowering neighboring pixel.

In some instances, the computing device may smooth the tangential vectors by computing the average vectors within a certain neighborhood of pixels. For example, the computing device may smooth gradients or tangential vectors within sets of pixels by using integral images, which may involve creating two maps of tangential vectors, one for the horizontal direction and one for the vertical direction. The computing device may then compute vectors for the maps between corresponding pixels in the 2D range image or within corresponding 3D points in the point cloud. The computing device may compute integral images to compute the average tangential vectors to calculate surface normals.

In some examples, the computing device may determine vector normal of different surfaces as represented by pixels in the 2D range image prior to completing the reception of sensor data from the same point cloud. The computing device may be configured to immediately start processing sensor data as it is received from the sensors, for example. In other examples, the computing device may wait to receive an entire point cloud of an area of the environment from a sensor prior to processing the data to determine vector normal of surfaces.

As an example implementation, a vehicle's computing device may use local geometric features such as surface normal or curvature within point form to determine information indicative of the environment of the vehicle. The computing device may determine a vector normal to a point (e.g., pixel) or a set of points (e.g., set of pixels) by fitting a plane to the point's local neighborhood, such as neighboring points. In some instances, the computing device may determine neighboring pixels of the 2D range image to use for calculating a surface normal of pixel by using a nearest neighbor process or selecting pixels within a radius distance from the pixel. When the computing device has focused upon a particular set of pixels to determine a surface normal from, the computing device may estimate the local surface normal by analyzing the eigenvectors of the covariance matrix of the set of pixels, for example.

The size of the set of pixels used to determine a surface normal may vary within examples. For example, the computing device may refrain from selecting a set of pixels that is too large, because the large number of pixels may cause the environmental structures to appear too smoothed out for an accurate surface normal determination. In the case that the computing device selects too few of pixels within a set to analyze for a surface normal, the estimated normals may be affected by noise in the received sensor data. The computing device may compensate negative effects by computing distances of pixels within the set of pixels to the local plane through the particular pixel focused upon for estimating a surface normal. The computing device may use the distances in an additional run to weight pixels in the set of pixels in the covariance computation. As a result, the computing device may better approximate the local surface structure and more accurately depict corners and edges of the surfaces.

In another example embodiment, the vehicle's computing device may use a fixed pixel neighborhood to extract surface normal information. For example, the computing device may use a fixed pixel neighborhood and may additionally subtract pre-computed neighbors outside of some maximum range of the surface. This way, the computing device may determine a surface normal of the pixels without a computationally expensive neighbor search.

In some example implementations, the computing device may compute surface normals in the local image coordinate frame or may transform both Cartesian coordinates based on the pixel information as well as the local surface normals into the base coordinate frame of the vehicle. The computing device may also use spherical coordinates of the local surface normals for processing the surface normals, for example. The computing device may further perform plane segmentation, which may involve clustering surfaces with similar surface normals to determine surfaces in the environment of the vehicle.

At block 310, the method 300 may include, based on the plurality of normal vectors of the one or more sets of pixels, providing object recognition information indicative of the one or more objects in the environment to one or more systems of the vehicle. The systems of a vehicle may use the information, including the normal vectors, for object recognition and/or object avoidance, for example.

In one example implementation, a computing device of a vehicle may provide object recognition information to the vehicle's control system. The control system may adjust steering, throttle, brakes, navigation/pathing system, or an obstacle avoidance system based on the received information. For example, the control system may adjust the path of the vehicle based on the information provided by the computing device.

In another example implementation, a computing device of a robotic device may use the object recognition information to recognize particular objects within a room or for obstacle avoidance. For example, the computing device may use the vector normals as well as segmentation using the surface normals to identify objects in the environment and avoid collisions.

In one example embodiment, the vehicle's computing device may receive a structured point cloud from LIDAR. The computing device may receive additional sensor data from other sensors as well. As the sensor data arrives, the computing device may project data points incrementally to build up a 2D range image. When the computing device accumulates enough data points from LIDAR or other sensors to fill a rectangular patch in the 2D range image, the computing device may proceed to calculate normal for just that rectangular patch. That way, the computing device may process incoming data points to determine vector normal for surfaces in the environment without buffering or waiting in general for the complete reception of a 3D point cloud. This may reduce computing latency as well as enable the computing device to more quickly process incoming sensor data.

In another example embodiment, a vehicle's computing device may receive laser data points from LIDAR in a particular format or sequence. For example, the computing device may receive laser data points from left-to-right relative to the environment and may also receive the laser data points as jagged lines instead of straight vertical lines. The computing device may be configured to predict formats based on the jagged lines and may use top-to-bottom vertical patches from a determined 2D range image by lagging behind the latest data by a fixed amount dictated by the degree of jaggedness of the lines.

In some example embodiments, the computing device of a vehicle may receive laser data points from LIDAR and/or other sensors and may wait to process the data until enough data points have been received to develop a larger rectangle of the 2D range image. As such, the computing device may take advantage of parallelism when running an algorithm for extracting vector normal information of surfaces in the 2D range image that correspond to surfaces within the vehicle's environment. In other examples, the computing device may process the laser data points in rectangles of the 2D range image prior to completing the reception of all laser data points within the same 3D point cloud provided by LIDAR.

In yet another example embodiment, the vehicle's computing device may use computed surface normals as well as plane segments and spherical coordinates for detecting obstacles in the environment. The computing device may compensate for noise in laser data and errors by projecting points onto the determined planes the points belong to. Further, the computing device may correct local surfaces at detected planes using other processes. The computing device may segment and classify planes in the acquired laser data.

In a further example embodiment, the computing device of a vehicle may receive sensor data and project the point cloud (structured or unstructured) to create a range image. The computing device may project the points of the point cloud prior to receiving the complete point cloud. As a result, the computing device may construct an ordered 3D point image from the 2D range image. The computing device may then compute gradients across and down the 3D point image and may further compute integral images of the gradient. Additionally, the computing device may reconstruct smoothed gradients from the integral images and may also reconstruct smoothed gradients from the integral images. In some instances, the computing device may compute the cross product of the smoothed gradients and may normalize and flip the cross products to produce surface normals.

Figure 4:
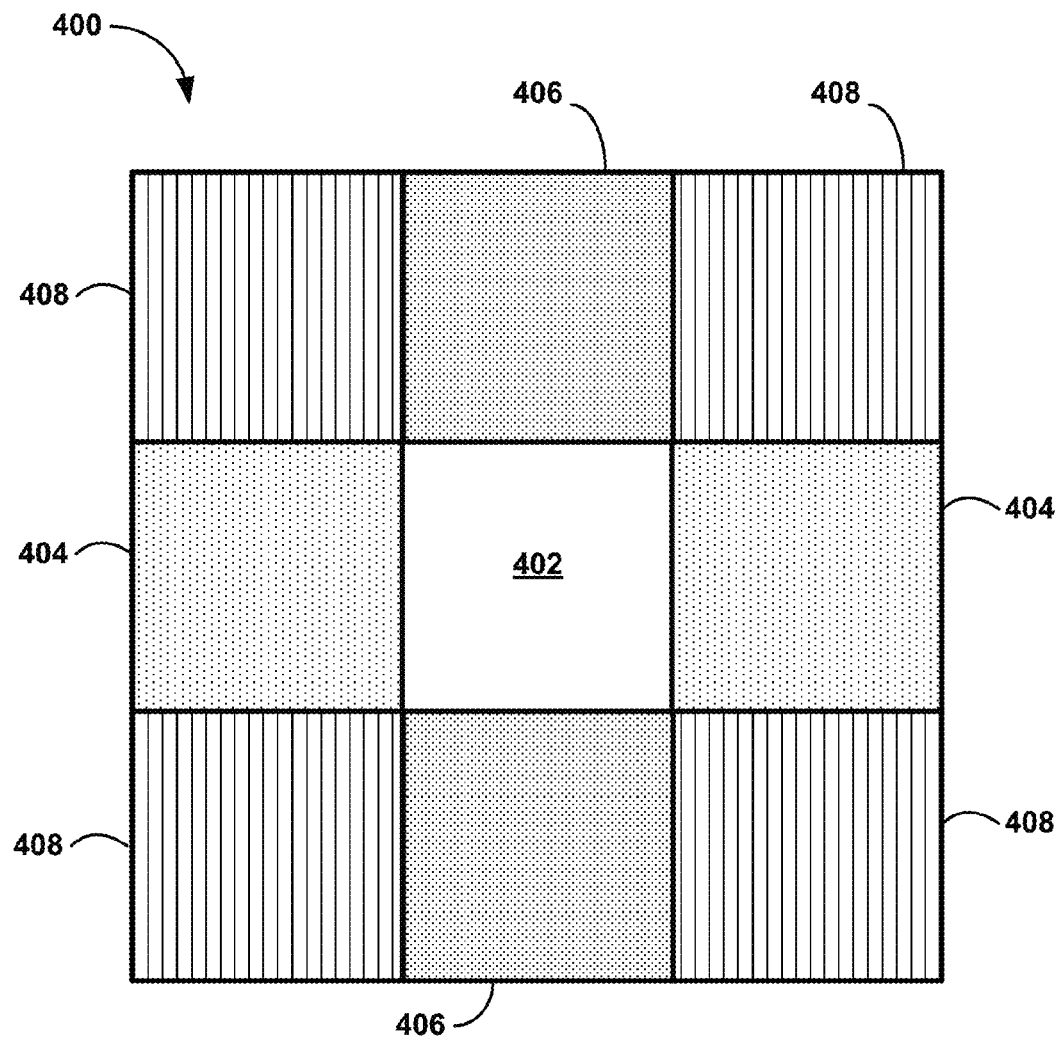
FIG. 4 is an example diagram illustrating pixels in a portion of a two dimensional range image.

FIG. 4 is an example diagram illustrating pixels in a portion of a two dimensional range image. The portion of the 2D range image 400 shows nine pixels 402-408 arranged in a square, but may include more or less pixels within other examples. A vehicle's computing device may develop and use the 2D range image including pixels 402-408 to extract object recognition information of the surrounding environment of the vehicle during navigation, which may include determining vector normal of specific surfaces in the environment based on sets of pixels.

In the example diagram, the center pixel 402 may represent an empty pixel that is indicative of a possible gap within the 2D range image determined by the vehicle's computing device using received laser data indicative of the environment. As previously described, a vehicle's computing device may use laser data to project and determine a 2D range image that is made up of pixels based on the data indicative of the environment as captured by a sensor, such as laser data received in a point cloud format. The 2D range image developed by the computing device may include one or multiple gaps, which may encompass pixels that may not correspond to data points received in the point cloud and thus, may not have a value.

In some example embodiments, to fill in the gaps in the 2D range image, such as center pixel 402 shown in FIG. 4, the computing device may use the values of neighboring pixels positioned proximal to the center pixel 402 to determine a value to give to the center pixel 402. By that operation, the computing device may fill in gaps within the 2D range image and thus, generate a more complete 2D range image to use for determining normal vectors of sets of pixels that may correspond to a surface in the environment of the vehicle.

As one example, the vehicle's computing device may use the neighboring pixels 404 positioned to the left and right sides of the center pixel 402 to determine a value for the center pixel 402. For example, the computing device may calculate an average value of the neighboring pixels 404 positioned to the left and the right of the center pixel 402 to assign the average value to the center pixel 402. In some instances, the computing device may use additional pixels on the sides of the center pixel 402 as well to calculate an average for the center pixel 402.

Similarly, in another example, the computing device may use the neighboring pixels 406 positioned above and below the center pixel 402 to determine a possible value to assign to the center pixel 402 in order to fill in the gap within the 2D image. The computing device may use more or less pixels as well to determine a value for empty pixels, such as center pixel 402.

In another example embodiment, the computing device may use all the corners pixels to determine the value, such as pixels 408. Likewise, the computing device may use all the pixels 404-408 proximal to the center pixel 402 to calculate an average value to assign to the center pixel 402. In other examples, the computing device may use other combinations of pixels to determine a value for the center pixel 402, which may involve more or less pixels.

FIGS. 5A-5D show different views of a conceptual illustration of an example vehicle navigating using generated point clouds. As previously indicated, a vehicle may navigate using sensors, such as LIDAR, to extract measurements about the surrounding environment of the vehicle. A computing device of the vehicle may process the incoming information to avoid obstacles and ensure safe navigation, as shown in FIGS. 5A-5D. In some examples, a vehicle's computing device may develop portions of a 2D range image as data points are received from sensors. Similarly, the computing device may project the data points to develop an entire 360 degree panorama of a virtual 2D image that corresponds to the vehicle's environment, such as the portions of the 360 degree panorama illustrated in FIGS. 5A-5D.

FIG. 5A shows the example vehicle from a front-side view and illustrates portions of a virtual two dimensional range image generated by a computing device of the example vehicle using sensor data. As the example vehicle 502 navigates, sensors of the vehicle 502 may capture and provide data indicative of the environment to the vehicle's computing device. As previously discussed, upon receiving data from a sensor, such as laser data using LIDAR, the computing device may project the data to determine a conceptual 2D range image 504 that includes pixels based on the data that correspond to objects and other surfaces in the local environment. The computing device may start developing portions of the 2D range image 504 upon receiving a portion of a point cloud, for example.

In other examples, the computing device may wait for the entire point cloud received using LIDAR prior to determining the 2D range image 504. As the vehicle continues to navigate, the computing device may continue to receive new data from sensors, such as new point clouds of data, which the computing device may use to update its 2D range image 504 or generate new 2D images that correspond to the changing environment for processing and object detection. Furthermore, the computing device may use the 2D range image 504 or portions of the 2D range image to calculate surface normal of sets of pixels that correspond to the same surfaces in the environment, which the computing device may use along with segmentation to recreate a virtual range of the environment that may be used for obstacle avoidance and navigation. The 2D range image may include pixels that reflect the environment of the vehicle in a 2D virtual range format, for example.

Figure 5B:
FIG. 5B shows the example vehicle from a side view and illustrates additional portions of the two dimensional range image generated by the computing device of the example vehicle using sensor data.

FIG. 5B shows the example vehicle from a side view and illustrates additional portions of the two dimensional range image generated by the computing device of the example vehicle using sensor data. The computing device of the vehicle 502 may continuously update its 2D range image 504 or develop new 2D range images based on incoming sensor as the vehicle navigates a path of travel. The example illustration shown in FIG. 5B may represent another view of the example illustration shown in FIG. 5A or may illustrate the example vehicle at a different time period, such as before or after the time period shown in FIG. 5A.

Figure 5C:
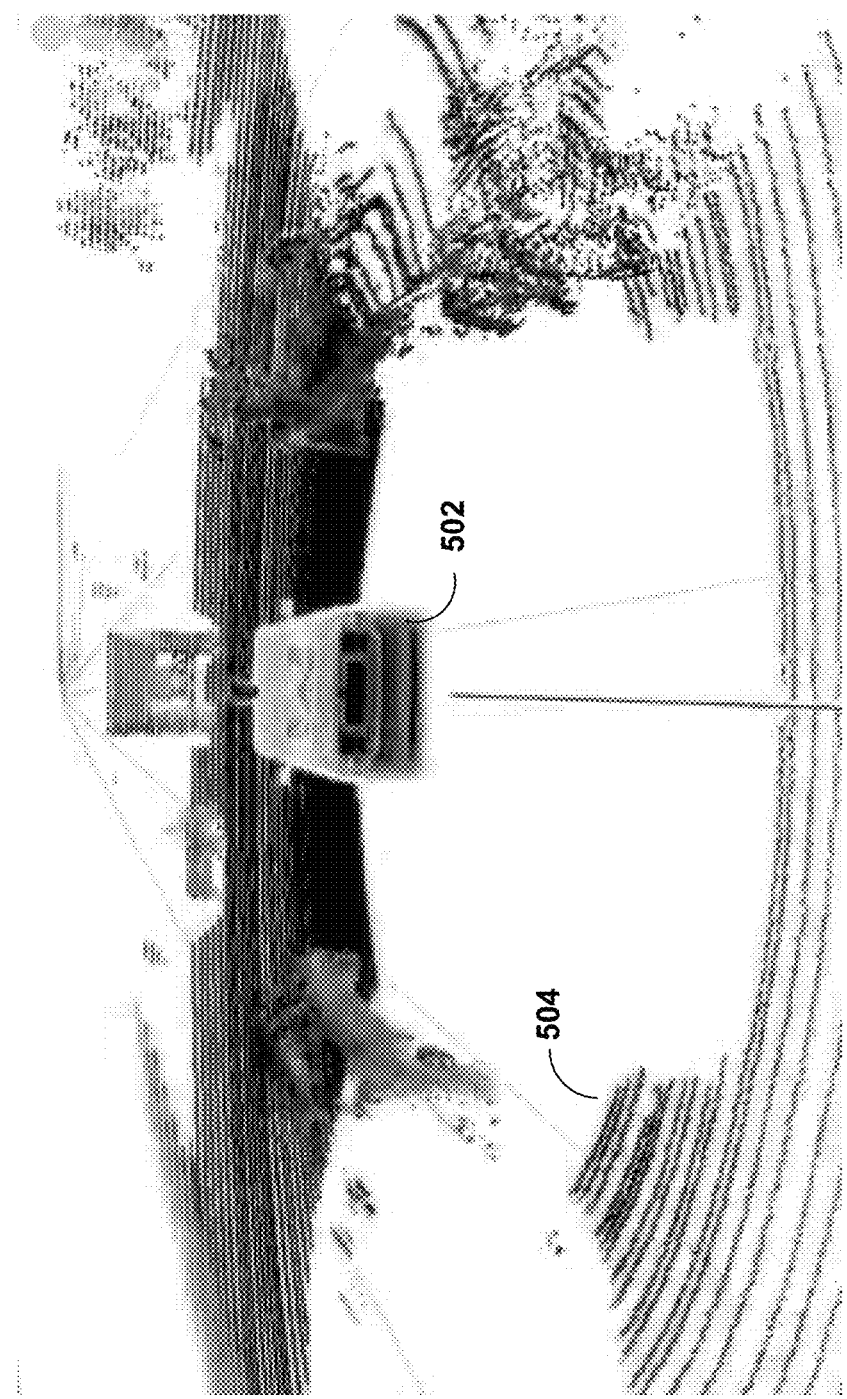
FIG. 5C shows the example vehicle from a back view and illustrates portions of the two dimensional range image generated by the computing device of the example vehicle using sensor data.

FIG. 5C shows the example vehicle from a back view and illustrates portions of the two dimensional range image generated by the computing device of the example vehicle using sensor data. Similar to FIGS. 5A-5B, the example illustration in FIG. 5C shows a portion of the 2D range image 504 that the example vehicle 502 may use for calculating vector normals of one or multiple surfaces in the surrounding environment as well as for object recognition purposes.

Figure 5D:
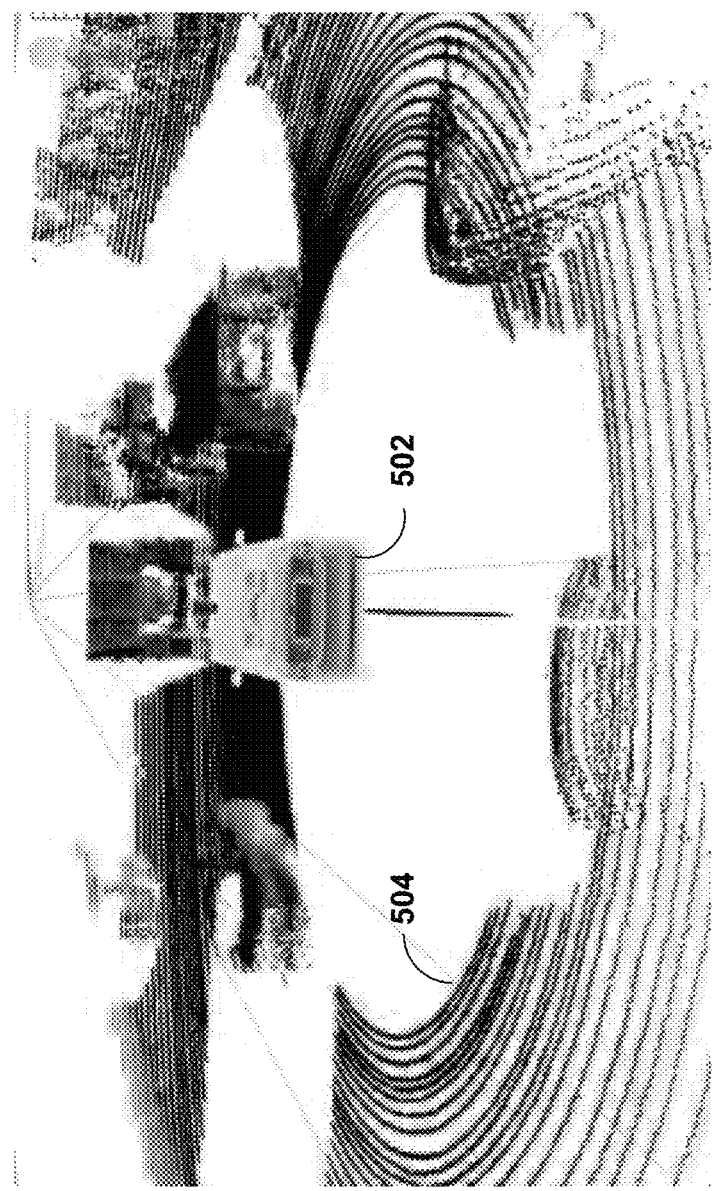
FIG. 5D shows the example vehicle from another back view and illustrates portions of the two dimensional range image generated by the computing device of the example vehicle using sensor data.

FIG. 5D shows the example vehicle from another back view and illustrates portions of the two dimensional range image generated by the computing device of the example vehicle using sensor data. Similar to the illustration shown in FIG. 5C, FIG. 5D shows the example vehicle 502 from a view from behind the vehicle 502 and also includes portions of the conceptual 2D range image 504 positioned around the vehicle. The example illustration shows changes in segments of the 2D range image 504 relative to the portions of the 2D range image shown in FIG. 5C.

Figure 6:
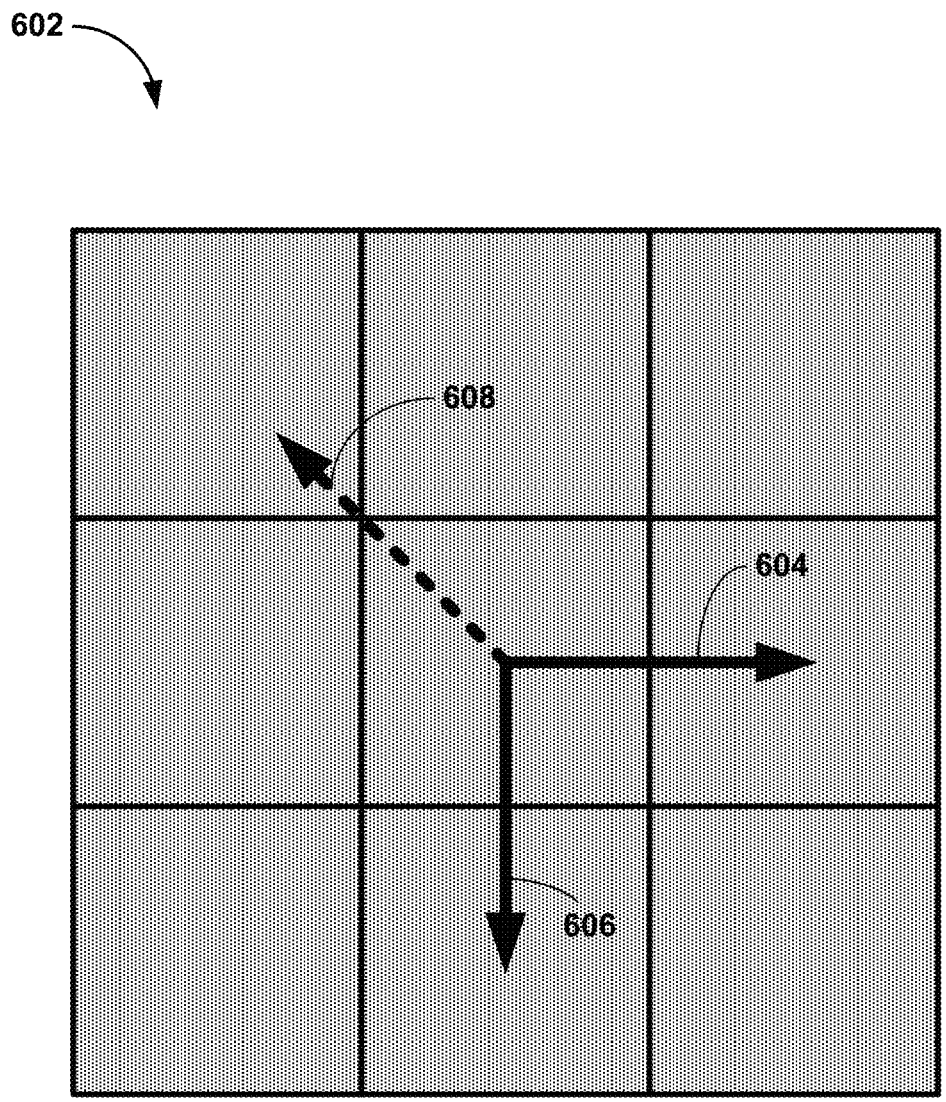
FIG. 6 is an example diagram illustrating a vector normal computation of a set of pixels.

FIG. 6 is an example diagram illustrating a vector normal computation of a set of pixels. The example diagram shows a set of pixels 602 that is made up of six pixels that may represent a portion of a 2D range image determined from laser data by a computing device of a vehicle. Although the example diagram shows the set of pixels 602 including 6 pixels, other examples may include more or less pixels. In the example diagram, the set of pixels 602 may represent a surface in the local environment of the vehicle. For example, the set of pixels 602 may represent a surface of an object, such as a vehicle, sign, boundary, or other type of surface. The computing device may determine the set of pixels 602 using various processes, such as selecting the neighborhood of pixels based on a predefined number that the computing device is configured to use. The computing device may use other methods or processes for determining which pixels and how many pixels to use for a set of pixels to extract a surface normal as well.

A computing device of the vehicle may process the set of pixels 602 by determining tangential vectors 604-606 in order to calculate the surface normal 608 associated with the set. As shown in the example diagram, the computing device may determine a horizontal vector 604 and a vertical vector 606 that connect to form a right angle. The computing device may determine other vectors for calculating the surface normal in other examples.

Upon determining the tangential vectors 604-606, the vehicle's computing device may calculate the surface normal vector 608, which may be calculated using the cross product of the tangential vectors 604-606. Other examples of determining the surface normal of the set of pixels 602 may exist as well. As such, the computing device may use the set of pixels 602 and vector normal 608 for objection detection. The computing device may provide the vector normal 608 associated with the set of pixels 602 as well as surface normals of other sets of pixels and/or other data to systems of the vehicle to use during navigation. Further, the computing device may also use segmentation to combine sets of pixels to map the environment based on surface normals and other information within the sensor data received.

Figure 7:
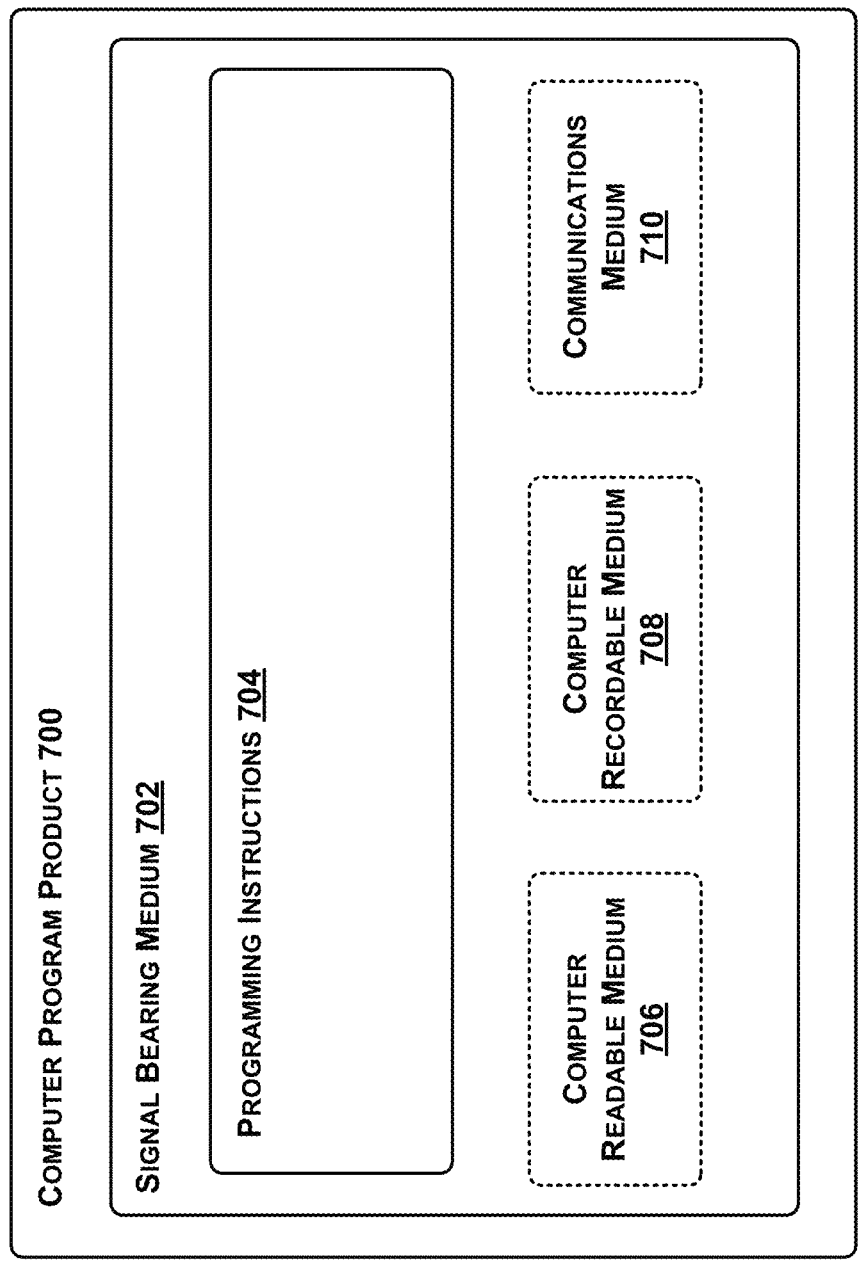
FIG. 7 is a schematic illustrating a conceptual partial view of an example computer program product that includes a computer program for executing a computer process on a computing device.

FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-3 and FIGS. 4A-4D. In some examples, the signal bearing medium 702 may encompass a computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the processor 112 of FIG. 1 may be configured to provide various operations, functions, or actions in response to the programming instructions 704 conveyed to the processor by one or more of the computer readable medium 706, the computer recordable medium 708, and/or the communications medium 710.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
   receiving, at a computing device, laser data indicative of an environment of a vehicle, wherein the laser data includes a plurality of data points associated with one or more objects in the environment;
   based on the plurality of data points, generating a two dimensional range image that includes a plurality of pixels indicative of respective positions of the one or more objects in the environment relative to the vehicle;
   modifying the generated two dimensional range image to provide respective values to one or more given pixels of the plurality of pixels that map to one or more portions of the one or more objects in the environment lacking laser data, wherein modifying the generated two dimensional range image to provide respective values to the one or more given pixels is based on respective neighboring pixels of the plurality of pixels positioned proximal to the one or more given pixels of the plurality of pixels in the two dimensional range image;
   based on the modified two dimensional range image, determining a plurality of normal vectors of one or more sets of pixels in the plurality of pixels that correspond to respective surfaces of the one or more objects in the environment; and
   based on the plurality of normal vectors of the one or more sets of pixels, providing object recognition information indicative of the one or more objects in the environment to one or more systems of the vehicle.

2. The method of claim 1, wherein the one or more given pixels of the plurality of pixels that map to the one or more portions of the one or more objects in the environment lacking laser data are indicative of noise in the laser data.

3. The method of claim 1, wherein receiving, at the computing device, laser data indicative of the environment of the vehicle comprises:
   receiving the plurality of data points associated with one or more objects in the environment in a structured point cloud.

4. The method of claim 1, wherein receiving, at the computing device, laser data indicative of the environment of the vehicle comprises:
   receiving the plurality of data points associated with one or more objects in the environment in an unstructured point cloud.

5. The method of claim 1, wherein receiving, at the computing device, laser data indicative of the environment of the vehicle comprises:
   receiving the plurality of data points associated with one or more objects in the environment in a point cloud format other than a grid-like point cloud.

6. The method of claim 1, wherein based on the plurality of data points, generating the two dimensional range image that includes the plurality of pixels indicative of respective positions of the one or more objects in the environment relative to the vehicle comprises:
   generating at least an initial portion of the two dimensional range image upon receiving a first portion of the plurality of data points of a point cloud.

7. The method of claim 1, wherein modifying the generated two dimensional range image to provide respective values to the one or more given pixels is further based on an average value of the respective neighboring pixels of the plurality of pixels positioned proximal to the one or more given pixels of the plurality of pixels in the two dimensional range image.

8. The method of claim 7, wherein modifying the generated two dimensional range image to provide respective values to the one or more given pixels is further based on the average value of the respective neighboring pixels of the plurality of pixels positioned proximal to the one or more given pixels of the plurality of pixels in the two dimensional range image further comprises:
   using respective neighboring pixels positioned on top and bottom of the respective pixel or respective neighboring pixels positioned on left and right of the respective pixel to estimate the average value.

9. The method of claim 1, wherein based on the modified two dimensional range image, determining the plurality of normal vectors of one or more sets of pixels in the plurality of pixels that correspond to respective surfaces of the one or more objects in the environment comprises:
   estimating one or more gradients in the modified two dimensional range image;
   smoothing the one or more gradients in the modified two dimensional range image using an integral image process, wherein the integral image process comprises determining one or more sets of average tangential vectors based on respective sums of pixels in the one or more gradients;
   determining one or more cross products of the one or more smoothed gradients using the one or more sets of average tangential vectors;
   based on the one or more cross products of the one or more smoothed gradients, determining the plurality of normal vectors of the one or more sets of pixels.

10. The method of claim 1, wherein generating the two dimensional range image that includes the plurality of pixels indicative of respective positions of the one or more objects in the environment relative to the vehicle comprises:
    projecting the plurality of data points onto a conceptual cylindrical two dimensional surface surrounding the vehicle to generate the two dimensional range image, wherein projecting the plurality of data points onto the conceptual cylindrical two dimensional surface comprises positioning pixels in the two dimensional surface based on data associated with the plurality of data points.

11. The method of claim 1, wherein the generated two dimensional range image is a virtual 360 degree panorama indicative of the environment of the vehicle.

12. The method of claim 1, wherein the plurality of pixels other than the one or more empty pixels in the two dimensional range image correspond to the plurality of data points associated with the one or more objects in the environment.

13. A system comprising:
    at least one processor; and
    a memory having stored thereon instructions that, upon execution by the at least one processor, cause the system to perform functions comprising:
      receiving laser data indicative of an environment of a vehicle, wherein the laser data includes a plurality of data points associated with one or more objects in the environment;

based on the plurality of data points, generating a two dimensional range image that includes a plurality of pixels indicative of respective positions of the one or more objects in the environment relative to the vehicle;

modifying the generated two dimensional range image to provide respective values to one or more given pixels of the plurality of pixels that map to one or more portions of the one or more objects in the environment lacking laser data, wherein modifying the generated two dimensional range image to provide respective values to the one or more given pixels is based on respective neighboring pixels of the plurality of pixels positioned proximal to the one or more given pixels of the plurality of pixels in the two dimensional range image;

based on the modified two dimensional range image, determining a plurality of normal vectors of one or more sets of pixels in the plurality of pixels that correspond to respective surfaces of the one or more objects in the environment; and based on the plurality of normal vectors of the one or more sets of pixels, providing object recognition information indicative of the one or more objects in the environment to one or more systems of the vehicle.

14. The system of claim 13, wherein generating the two dimensional range image that includes the plurality of pixels indicative of respective positions of the one or more objects in the environment relative to the vehicle is further based on data provided by a depth camera system of the vehicle.

15. The system of claim 13, wherein the function of determining the plurality of normal vectors of one or more sets of pixels in the plurality of pixels that correspond to respective surfaces of the one or more objects in the environment comprises:

determining the one or more sets of pixels using a fixed pixel neighborhood process, wherein the fixed pixel neighborhood process comprises:

determining a center pixel that corresponds to a respective surface of the one or more objects in the environment; and based on respective distances of given pixels in the plurality of pixels relative to the center pixel, selecting a predefined number of pixels including the center pixel for a respective set of pixels of the one more sets of pixels.

16. The system of claim 13, wherein the laser data is provided by a LIDAR module of the vehicle.

17. The system of claim 13, further comprising:

based on the plurality of normal vectors of the one or more sets of pixels, performing a plane segmentation process to connect the one or more sets of pixels; and based on performing the plane segmentation process, providing a virtual rendering indicative of the environment to the one or more systems of the vehicle.

18. A non-transitory computer readable medium having stored thereon instructions that, upon execution by a computing device, cause the computing device to perform functions comprising:

receiving laser data indicative of an environment of a vehicle, wherein the laser data includes a plurality of data points associated with one or more objects in the environment;

based on the plurality of data points, generating a two dimensional range image that includes a plurality of pixels indicative of respective positions of the one or more objects in the environment relative to the vehicle;

modifying the generated two dimensional range image to provide respective values to one or more given pixels of the plurality of pixels that map to one or more portions of the one or more objects in the environment lacking laser data, wherein modifying the generated two dimensional range image to provide respective values to the one or more given pixels is based on respective neighboring pixels of the plurality of pixels positioned proximal to the one or more given pixels of the plurality of pixels in the two dimensional range image;

based on the modified two dimensional range image, determining a plurality of normal vectors of one or more sets of pixels in the plurality of pixels that correspond to respective surfaces of the one or more objects in the environment; and based on the plurality of normal vectors of the one or more sets of pixels, providing object recognition information indicative of the one or more objects in the environment to one or more systems of the vehicle.

19. The non-transitory computer readable medium of claim 18, wherein the function of generating the two dimensional range image that includes the plurality of pixels indicative of respective positions of the one or more objects in the environment relative to the vehicle comprises:

generating respective portions of the two dimensional range image upon receiving one or more subsets of the plurality of data points, wherein the one or more subsets of the plurality of data points correspond to a point cloud.

20. The non-transitory computer readable medium of claim 18, further comprising:

based on the plurality of normal vectors of the one or more sets of pixels, performing a plane segmentation process to connect the one or more sets of pixels in a virtual map of the environment; and based on the virtual map of the environment, determining a control strategy to control the vehicle.

* * * * *